United States Patent
Boatwright et al.

[11] 3,749,815
[45] July 31, 1973

[54] FLUSH BOX FOR PLUG RECEPTACLES

[76] Inventors: Daniel J. Boatwright, 2616 62nd St.;
Lloyd T. Hatcher, 9332 Carpenter, both of Des Moines, Iowa 50322

[22] Filed: Mar. 20, 1972

[21] Appl. No.: 236,140

[52] U.S. Cl. .................... 174/66, 220/24.2, 339/39
[51] Int. Cl. ............................................. H02g 3/14
[58] Field of Search ................ 174/66, 67, 65 G; 220/3.8, 24.2, 24.3; 339/39, 44, 122, 123

[56] References Cited
UNITED STATES PATENTS

| | | | |
|---|---|---|---|
| 3,428,936 | 2/1969 | Arnao | 174/67 UX |
| 2,225,472 | 12/1940 | Franklin | 174/65 G X |
| 3,597,526 | 8/1971 | Boatwright | 174/66 |
| 1,221,652 | 4/1917 | Badeau | 220/24.3 |

Primary Examiner—Bernard A. Gilheany
Assistant Examiner—D. A. Tone
Attorney—Zarley, McKee & Thomte

[57] ABSTRACT

A flush box for plug receptacles is disclosed herein which generally comprises a box means including an open face at one side thereof. A cover element is mounted on the open face of the box means and comprises first and second plate elements which are pivotally secured together. The plate members cooperate to form the external peripheral shape of the cover element. The plate elements each have a semi-circular access opening formed therein opposite to each other and complementary therewith so as to define a circular access opening when the plate elements are in their normal closed position. A flexible conduit extends through the circular access opening into the box means and has a first plug element secured thereto which matingly engages a second plug element in the box means. A flat hinge member pivotally connects the plate elements together to permit one of the plate elements to be moved with respect to the other plate element to permit the first plug element to be easily inserted into the box means or withdrawn therefrom when the one plate element has been pivotaly moved with respect to the other plate element. Means is also provided to yieldably maintain the plate elements in their assembled or closed position. A resilient grommet is positioned in the circular access opening when the plate elements are in their closed position.

9 Claims, 6 Drawing Figures

PATENTED JUL 31 1973  3,749,815

FLUSH BOX FOR PLUG RECEPTACLES

Conventional plug receptacle boxes such as those used for telephone plug receptacles extend outwardly from the wall and do not present an aesthetic appearance. Further, the boxes are difficult to service since the covers thereof must be completely removed to provide access to the plug elements therein. In applicants' prior U.S. Pat. No. 3,597,526, a flush box was provided which substantially overcame the shortcomings of the prior art. The instant invention represents a significant advance over applicants' earlier device.

Therefore, it is a principal object of this invention to provide a flush box for plug receptacles.

A further object of this invention is to provide an improved flush box for plug receptacles.

A further object of this invention is to provide a flush box for plug receptacles especially adapted for use with telephone plug receptacles.

A further object of this invention is to provide a flush box for plug receptacles including first and second plate elements which are pivotally secured together to provide easy ingress and egress with respect to the box means.

A further object of this invention is to provide a flush box for plug receptacles including first and second plate elements which are pivotally secured together, one of the plate elements being movable with respect to the other plate element to provide easy ingress and egress with respect to the box means.

A further object of this invention is to provide a flush box for plug receptacles including a cover element having a circular access opening formed therein which is defined by complementary semi-circular access openings formed in cooperating plate elements.

A further object of this invention is to provide a flush box for plug receptacles which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
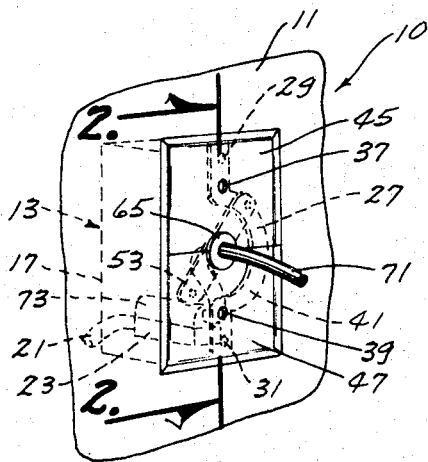
FIG. 1 is a front perspective view of the device of this invention.
Figure 2:
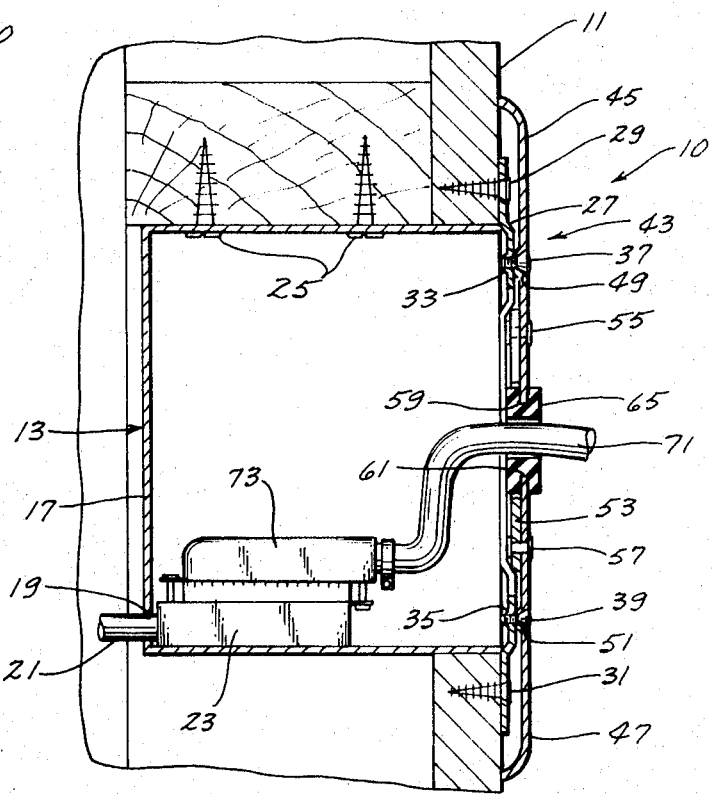
FIG. 2 is a sectional view taken on line 2—2 of FIG. 1.
Figure 3:
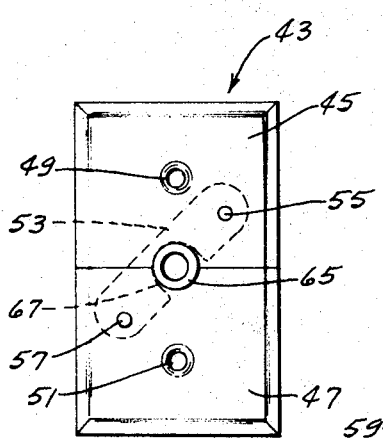
FIG. 3 is a front view of the cover in a closed position.
Figure 6:
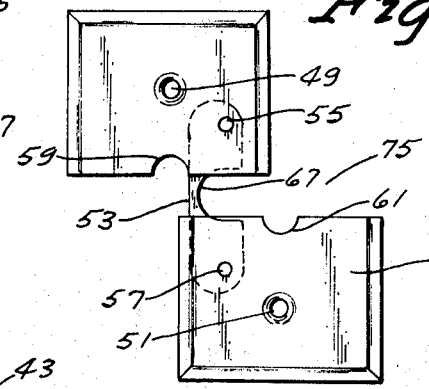
FIG. 6 is a front view of the cover in an open position.

The flush box of this invention is generally referred to by the reference numeral 10 and is ideally suited for use in a wall or the like such as indicated by 11 in FIGS. 1 and 2. The flush box 10 of this invention generally comprises a box means 13 having an open face 15 which is flush with the exterior surface of the wall 11 as illustrated in FIG. 2. Box means 13 also includes a back wall 17 having an opening 19 formed therein through which extends a flexible conduit 21. A plug element 23 is secured to conduit 21 in the interior of box means 13 as illustrated in FIG. 2. Box means 13 is secured to the wall 11 by any convenient means such as screws 25 for example.

The numeral 27 refers to a bracket which extends over the open face of the box means as illustrated in FIGS. 1 and 2 and which is secured to the wall 11 by means of screws 29 and 31 extending through its upper and lower ends respectively and into the wall 11 as shown in FIG. 2. Bracket 27 also includes threaded openings 33 and 35 shown therein adapted to receive screws 37 and 39 respectively. Bracket 27 includes a semi-circular intermediate portion 41 which is offset to one side of the opposite ends thereof for a purpose to be explained in more detail hereinafter.

Figure 4:
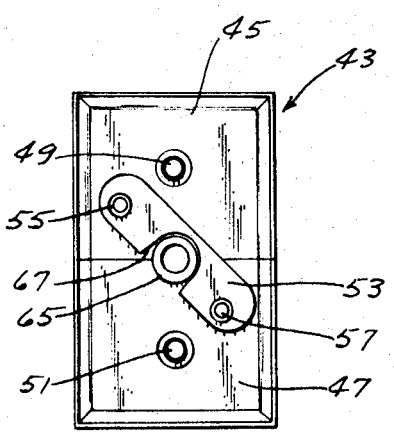
FIG. 4 is a rear view of the cover in a closed position.

A cover element 43 comprising plate elements 45 and 47 is mounted on the box means 13 by means of the screws 37 and 39 extending through openings 49 and 51 respectively in cover element 43 and being threadably received by the openings 33 and 35 in the bracket 27. The plate elements are pivotally secured together by means of a flat hinge member 53 as seen in FIG. 4. One end of hinge member 53 is pivotally secured to plate element 45 by means of a rivet 55 or the like extending therethrough. The other end of hinge member 53 is pivotally secured to plate element 47 by means of rivet 57 or the like extending therethrough. As seen in FIG. 4, the longitudinal axis of the hinge member 53 is angularly disposed with respect to the central longitudinal axis of the cover element to permit plate element 45 to be moved from the position of FIG. 4 to the position of FIG. 5.

Plate elements 45 and 47 are provided with semi-circular access openings 59 and 61 formed therein respectively which are disposed opposite to each other and complementary to each other so as to define a circular access opening 63 when the plate members are in their normal "closed" position illustrated in FIGS. 1, 2, 3 and 4.

The numeral 65 refers to a split resilient grommet which is positioned in the circular access opening 63 when the plate elements are in their closed position so as to prevent damage to the conduit extending therethrough. Hinge member 53 is provided with a cut away portion 67 intermediate its ends as viewed in FIG. 4 which is positioned rearwardly of the circular access opening 63 to permit the conduit to extend therethrough without interference.

A flexible conduit 71 extends through the access opening 63 and into the interior of the box means 13 as shown in FIG. 2. Plug element 73 is secured to the inner end of the conduit 71 and matingly engages the plug element 23. Conduit 71 would be connected at its other end to the telephone or the like.

The box means 13 would normally be installed in the wall 11 as illustrated in FIG. 2 with the conduit 21 being secured to the plug element 23 and extending through the wall in conventional fashion. When it is desired to connect the plug element 73 to the plug element 23, it is simply necessary to remove the screw 37 and pivot the plate element 45 from the position of FIG. 3 to the position illustrated in FIG. 5. Plug element 73 is then inserted into the interior of the box means 13 through the opening generally referred to by the reference numeral 75 in FIG. 5. Plug element 73 is then connected to the plug element 23. The flexible conduit is then inserted through the split in the split grommet 65 and the plate element 45 moved from the position of FIG. 5 to the position of FIG. 3. The semicircular access opening 59 receives the upper portion of the split grommet 65 as the plate element 45 is moved to its closed position. When the plate element 45 has been moved to its closed position, the flexible conduit 71 extends outwardly through the center of the split grommet 65 and the circular access opening 69. Screw means 37 is then inserted through the opening 49 and threadably tightened into the threaded opening 35 in the bracket 27 to maintain the plate elements in their closed position. The plate elements 45 and 47 cooperate to form the external peripheral shape of the cover element 43 as illustrated in the drawings.

Figure 5:
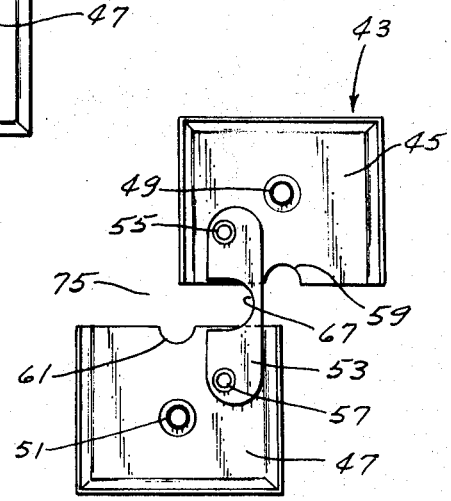
FIG. 5 is a rear view of the cover element in its open position.

The plug element 73 is smaller in size than the opening 75 to permit easy ingress and egress thereof with respect to the box means 13 when the plate element 45 is pivoted to the position of FIG. 5 thereby separating the semicircular access openings 59 and 61 and also exposing a portion of the open face of the box means. The relationship of the plate element 45 with respect to the plate element 47 and the pivotal connection therebetween permits the plug elements to be easily connected, disconnected or serviced without removing the entire cover element 43 from the wall. It is simply necessary to remove a single screw and to pivot the plate element 45 from the position of FIG. 3 to the position of FIG. 5. When the cover element is in the assembled or closed position illustrated in FIG. 3, the plate elements 45 and 47 cooperate to form an attractive and unobtrusive cover element 43. Thus it can be seen that the flush box accomplishes at least all of its stated objectives.

We claim:

1. In a flush box for plug receptacles,
a box means having at least one open face,
a first plug element in said box means,
a cover element on the open face of said box means comprising first and second plate elements pivotally secured together, said plate elements being pivotally secured together about an axis which is transverse to the plane of said plate elements, said first and second plate elements having complementary semi-circular access openings formed therein which cooperate to form a circular access opening when said plate elements are in a first position, said plate elements cooperating to form the peripheral shape of said cover element when in said first position, said first plate element being pivotally movable from its first position to a second position with respect to said second plate element to separate said semi-circular access openings and to open a portion of the open face of said box means,
a flexible conduit extending through the circular access opening in said cover element,
a second plug element on said conduit within said box means and matingly engaged with said first plug element,
said second plug element being smaller than the said portion of the open face of said box means to permit easy ingress and egress thereof with respect to the box means when said first plate element has been moved to its said second position,
and screw elements extending through each of said plate elements to maintain said cover element on the open face of said box means and to maintain said plate elements in said first position.

2. The box of claim 1 wherein a resilient grommet is positioned in said circular access opening.

3. The box of claim 1 wherein a first bracket extends over the open face of said box means, said bracket having a portion intermediate its ends which is offset to one side of said circular access opening so as to leave the opposite side of said circular access opening free from obstruction; each of said screw elements being received by said first bracket.

4. The box of claim 1 wherein said plate elements have inner and outer sides, an elongated flat member pivotally connected at one end thereof to said first plate element and pivotally connected at its other end to said second plate element, said flat member being positioned adjacent the inner side of said plate elements.

5. The box of claim 4 wherein said cover element is rectangular in shape, the longitudinal axis of said flat member being angularly disposed with respect to the longitudinal axis of said cover element when said plate elements are in said first position.

6. The box of claim 5 wherein said flat member has a cut away portion formed therein intermediate its ends which is positioned adjacent said circular access opening when said plate elements are in said first position.

7. A cover element comprising,
first and second substantially flat plate elements pivotally secured together about an axis which is transverse to the plane of said plate elements, said first and second plate elements having complementary semi-circular access openings formed therein which cooperate to form a circular access opening when said plate elements are in a first position, said plate elements cooperating to form the peripheral shape of said cover element when in said first position, said first plate element being pivotally movable from its first position to a second position with respect to said second plate element to separate said semi-circular access openings,
said plate elements having inner and outer sides,
connection means adjacent the inner sides of said plate elements pivotally connecting said plate elements,
and means for maintaining said plate elements in said first position.

8. A cover element comprising,
first and second plate elements pivotally secured together about an axis which is transverse to the plane of said plate elements, said first and second plate elements having complementary semi-circular access openings formed therein which cooperate to form a circular access opening when said plate elements are in a first position, said plate elements cooperating to form the peripheral shape of said cover element when in said first position, said first plate element being pivotally movable from its first position to a second position with respect to said second plate element to separate said semi-circular access openings,
and means maintaining said plate elements in said first position,
said plate elements having inner and outer sides, an elongated flat member pivotally connected at one end thereof to said first plate element and pivotally connected at its other end to said second plate element, said flat member being positioned adjacent the inner side of said plate elements, said plate elements cooperating to form a rectangular cover element when in said first position, the longtiudinal axis of said flat member being angularly disposed with respect to the longitudinal axis of the cover element when said plate elements are in said first position.

9. The cover element of claim 8 wherein a resilient, split grommet is positioned in said circular access opening.

* * * * *